(12) United States Patent
Blochmann

(10) Patent No.: US 8,496,468 B2
(45) Date of Patent: Jul. 30, 2013

(54) BLOW VALVE

(75) Inventor: Erik Blochmann, Neutraubling (DE)

(73) Assignee: Krones AG, Neutraubling (DE)

( * ) Notice: Subject to any disclaimer, the term of this patent is extended or adjusted under 35 U.S.C. 154(b) by 302 days.

(21) Appl. No.: 12/876,286

(22) Filed: Sep. 7, 2010

(65) Prior Publication Data

US 2011/0062368 A1     Mar. 17, 2011

(30) Foreign Application Priority Data

Sep. 11, 2009   (DE) .......................... 10 2009 041 253

(51) Int. Cl.
*B29C 49/42*     (2006.01)
*F16K 25/00*     (2006.01)

(52) U.S. Cl.
USPC ............................ 425/535; 251/333; 251/366

(58) Field of Classification Search
USPC ............................ 425/535; 251/122, 333, 366
See application file for complete search history.

(56) References Cited

U.S. PATENT DOCUMENTS

| | | |
|---|---|---|
| 3,747,625 A | 7/1973 | Reilly |
| 4,403,940 A | 9/1983 | Krishnamurnar et al. |
| 4,473,515 A | 9/1984 | Ryder |
| 4,688,755 A * | 8/1987 | Pluviose ...................... 251/121 |
| 4,789,132 A | 12/1988 | Fujita et al. |
| 4,872,638 A * | 10/1989 | Thompson et al. ............. 251/54 |
| 5,037,277 A * | 8/1991 | Tan ................................ 417/567 |
| 2002/0129855 A1 | 9/2002 | Weiler, Jr. |
| 2003/0118686 A1 | 6/2003 | Voth et al. |
| 2004/0051072 A1 * | 3/2004 | Hardin .......................... 251/333 |
| 2005/0253101 A1 | 11/2005 | Schaupp et al. |
| 2008/0001110 A1 * | 1/2008 | Nagai ............................ 251/122 |

FOREIGN PATENT DOCUMENTS

| | | |
|---|---|---|
| DE | 69010349 T2 | 1/1995 |
| DE | 19509776 A1 | 9/1996 |
| EP | 0775655 A1 | 5/1997 |
| EP | 1328396 A1 | 7/2003 |
| FR | 2878308 A1 | 5/2006 |
| GB | 1424219 A | 2/1976 |
| WO | WO-2006008380 A1 | 1/2006 |

OTHER PUBLICATIONS

European Search Report for 10170878.2 mailed Feb. 1, 2011.
German Search Report for 10 2009 041 253.0, dated Mar. 6, 2012.
The State Intellectual Property Office of the People's Republic of China, Notification of Second Office Action, Application No. 201010223377.5, dated Mar. 4, 2013.

* cited by examiner

*Primary Examiner* — Robert B Davis
(74) *Attorney, Agent, or Firm* — Marshall, Gerstein & Borun LLP

(57) ABSTRACT

A blow valve of a blow-molding machine for containers, having a valve seat which is arranged in a valve chamber between an inflow channel mouth and an outflow channel mouth and has assigned thereto a valve piston which is shiftable linearly between a shut-off position and a lifted open position and which with a piston extension carrying a closing surface passes sealingly shiftably through a bore of a wall defining the valve chamber, wherein a flow path which extends through the valve chamber between the mouths is shut off in the shut-off position and released in the open position, at least one guide surface which is generally inclined relative to the shifting direction of the valve piston is provided for the lateral forced deflection of the flow on the wall and/or on the piston extension.

19 Claims, 2 Drawing Sheets

BLOW VALVE

CROSS-REFERENCE TO RELATED APPLICATION

The present application claims the benefit of priority of German Application No. 102009041253.0, filed Sep. 11, 2009. The entire text of the priority application is incorporated herein by reference in its entirety.

FIELD OF THE DISCLOSURE

The present disclosure relates to a blow valve of the type used in blow molding machines for forming blow molded containers.

BACKGROUND

In such a blow valve known in practice, the upper side of the wall, which is opposite to and spaced from the mouths, is flat and perpendicular to the shifting direction of the valve piston. The piston extension has a flat surface which is perpendicular to the shifting direction and on which the closing surface is formed. For an easier handling of the circular closing surface the surface may comprise a central, flat and shallow recess at the end of the piston extension. The flow developing in the open position of the valve piston in the valve chamber must be deflected twice. When the blow valve is opened, the flow expands into the large-volume cylindrical valve chamber, the depth of which corresponds approximately to the opening lift and the diameter of which corresponds several times to the diameter of each mouth. The turbulent and delayed medium must squeeze out of the valve chamber into at least one mouth of the outflow channel and must be accelerated again. Dead spaces as well as considerable pressure losses caused by turbulences ensue from the geometric concept in the valve chamber, i.e. the flat surfaces oriented perpendicular to the shifting direction of the piston. It is difficult to clean the blow valve in the dead spaces. The unavoidable pressure losses result in undesired long switching differences between the opening pulse and the pressurization of the preform.

In the blow valve known from EP 1 328 396, the flow developing in the open position is deflected at least three times, each time by 90°, and expands in the large valve chamber. Strong turbulences resulting in inexpediently great pressure losses and long switching differences are created in the valve chamber.

It is one aspect of the present disclosure to indicate a blow valve of the aforementioned type which in the open opposition operates with a minimum pressure loss and thus with an optimally short switching difference. It is also part of the aspect to avoid inexpedient dead spaces that increase the compressed air consumption and deteriorate the cleanability, e.g. by way of rinsing the blow valve with a cleaning medium.

The at least one, generally inclined, guide surface effects a lateral forced deflection of the flow in the valve chamber, whereby strong turbulences caused by great pressure loss are minimized. The decrease in pressure loss is accompanied by an optimally short switching difference. Expediently, at least one guide surface is provided both in the wall and on the piston extension to create a low-turbulence, swift and, above all, guided flow from the inflow channel into the outflow channel in the open position. An improvement is however achieved with at least one guide surface on the piston extension or in the wall. Unharmonious or sharp and turbulence-promoting surface transitions are minimized. Only minimal dead spaces are created, if at all. The formation of swirls is thus minimal and the blow valve can be cleaned easily, e.g. in a rinsing process.

In an expedient embodiment, the respective guide surface, facing the flow, is concavely rounded at least in portions. A concave rounding considerably improves the flow pattern in the flow and thus reduces the pressure loss caused during deflection.

It is advantageous when the valve seat which is substantially oriented perpendicular to the shifting direction of the valve piston and/or the closing surface on the valve piston, is/are made flat, spherical or conical. Especially spherical or conical configurations that may be similar or alternate or may be combined with a flat design result in high tightness in the shut-off position, and also help to make the flow uniform, thereby further reducing the pressure loss.

In an expedient embodiment, the guide surfaces on the wall and on the piston extension harmoniously pass into one another in the open position so as to put up as little flow resistance as possible to the exterior faster boundary layer of the flow.

In an expedient embodiment the guide surface even extends on the wall directly up to the mouth, so that the flow is directly guided up and into the mouth without any significant separation.

In a constructionally simple embodiment the wall is formed by a ring stationarily inserted into the valve chamber. It may be the function of the ring to define with the bottom side a pilot chamber in which the valve piston is actuated by a closing force-generating pilot pressure on an actuation surface larger than the piston extension. Preferably, because of the larger actuation surface a relatively moderate pilot pressure suffices for holding the shut-off position and after reduction of the pilot pressure the valve piston is brought by the inflow pressure very rapidly into the open position.

In a particularly expedient embodiment, apart from a central mouth, two exterior mouths that are diametrically arranged relative to the axis of the central mouth are provided that have each assigned thereto an outwardly ascending guide surface on the wall. By contrast, the piston extension that is oriented relative to the central mouth and immerses at least in the shut-off position into the central mouth in portions comprises two descending guide surfaces that are connected via an elevated flow division zone and oriented relative to the exterior mouths. The mouths may be circular, oval or kidney-shaped, or they may have any desired shape. It would also be possible to provide just one exterior mouth. In this configuration, an especially neat flow guiding operation with a low pressure loss is achieved. Independently of the question which mouth pertains to the inflow channel and which one to the outflow channel, either the flow from the inflow channel mouth is divided with low loss into two substantially identical partial flows that are guided to the exterior mouths, or two partial flows from the exterior mouths pertaining to the inflow channel are harmoniously combined in a flow extending into the mouth to the outflow channel.

To keep dead spaces as small as possible, and to enforce a neat flow-guiding process, it may be advantageous when the guide surfaces are formed in trough-like recesses in the piston extension and in the wall. The width of each recess can here correspond to the diameter of the exterior mouth or the central mouth.

In an expedient embodiment, these recesses have at least about the same depth in the shifting direction of the valve piston, resulting in a harmonious flow path of a large cross-section in the open position.

Particularly expediently, the guide surfaces are defined by displacement bodies provided on the wall and the valve piston. The displacement bodies minimize the dead volume in the valve chamber, so that the guided flow is without any expansion generating significant pressure losses and without any swirl.

In another expedient embodiment, the recesses in the flow direction can even gradually narrow down and preferably form a nozzle cross-section similar to a venturi nozzle that is constricted towards the outflow channel, so that the flow is made uniform and accelerated, whereby the pressure loss can even be reduced further.

The flow direction in the blow valve can be chosen according to requirements. The central mouth is preferably assigned to the inflow channel and the exterior mouth or both exterior mouths are assigned to the outflow channel.

The ring arranged in the valve chamber may be split into a lower ring providing the necessary sealing and into an upper ring serving to guide the flow. The ring serving to guide the flow could also be used for retrofitting already used blow valves, and it could even consist of plastic.

To improve the flow conditions also in or from the respective mouth, at least one of the mouths may comprise a counter-guide surface.

BRIEF DESCRIPTION OF THE DRAWINGS

Embodiments of the subject matter of the disclosure are explained with reference to the drawing, in which.

DETAILED DESCRIPTION OF THE PREFERRED EMBODIMENT

Figure 1:
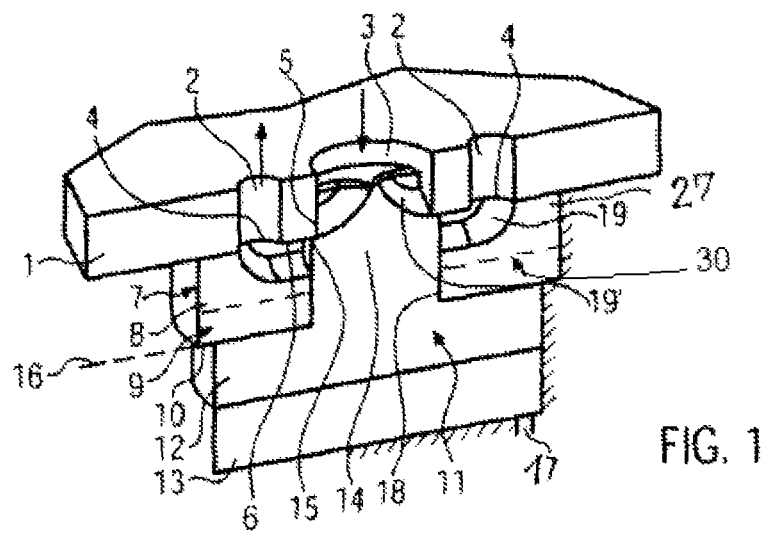
FIG. 1 shows an axial section of a blow valve in shut-off position.
Figure 2:
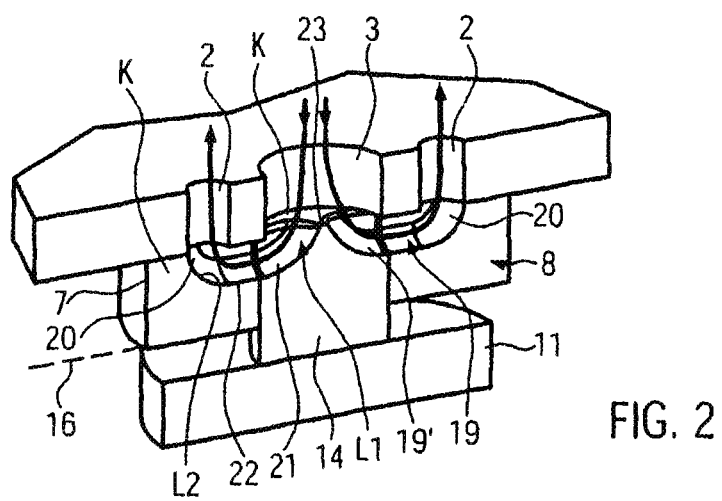
FIG. 2 shows an axial section of the blow valve in open position.

The embodiment of a blow valve V as shown in FIG. 1 (shut-off position) and in FIG. 2 (open position) is e.g. switched by a control pressure from a pilot valve (no shown) into the shut-off position and is brought into the open position by the prevailing inflow pressure after reduction of the control pressure. Alternatively, the blow valve V could be operated mechanically or by a magnet (not shown).

A housing (not shown) of the blow valve V has installed therein a plate 1 which has arranged therein a central inflow channel 3, which is designed as an axial bore, and two exterior outflow channels 2 which are diametrically positioned relative to the inflow channel 3 and are each configured as circular bores. The channels 2, 3 form e.g. circular mouths 4, 5 on the underside of the plate 1. The respective mouth could also be made oval, kidney-shaped or formed in any desired way. A valve chamber 7 which is defined by a wall 8, for instance in the form of a ring 9, is located underneath the plate 1. A valve piston 11 (differential piston) which has a lower large-diameter piston member 12 and a central piston extension 14 of a smaller diameter is sealingly displaceably guided in the valve chamber 7. A control chamber 13 with a control pressure connection 17 leading to said chamber is provided on the underside of the valve piston 11. On the piston extension 14, a closing surface 15 (here for instance a circular surface arranged substantially perpendicular to the shifting direction of the valve piston 11) is provided on the upper end. The piston extension 14 is formed by at least one seal 18 in the bore of the ring 9. An intermediate ring chamber 10 between the large-diameter piston member 13 and the ring 9 can be vented for instance via a connection 16. In the shut-off position at least part of the piston extension 14 can immerse into the mouth 5 of the inflow channel 3.

According to FIG. 2 guide surfaces L1, L2 that are oriented towards the channels 2, 3 are formed in the piston extension 14 and in the wall 8. The guide surfaces L1, L2 extend in general in oblique fashion relative to the shifting direction of the valve piston 11 and are preferably concavely rounded at least in portions for the flow developing in the open position (outlined by arrows). In the wall 8, a surface section 20 which is ascending in obliquely curved fashion and concavely rounded in transverse direction passes into a surface section 22 which extends approximately perpendicular to the shifting direction of the valve body 11 and is also concavely rounded in transverse direction. In the piston extension 14, and starting from an elevated flow division zone 23, an oblique surface section 21 is provided that is curved and concavely rounded in transverse direction. The surface sections 22, 21 are e.g. approximately semi-round. Trough-like recesses 19, 19' are thereby formed both in the piston extension 14 and in the wall, with the recesses passing harmoniously into each other in the open position shown in FIG. 2.

The recesses 19, 19' are so to speak positioned between displacement bodies K of the wall 8 and of the piston extension 14; these bodies are provided at both sides and reduce the dead volume in the valve chamber 7 to a degree providing optimum flow guidance conditions in the valve chamber 7. The displacement bodies K of the wall 8 may abut on the plate 1. The displacement bodies K on the piston extension 14 end in the open position at, on or slightly in the mouth 5. The depths of the recesses 19, 19' as viewed in the shifting direction of the valve piston 11 are approximately identical. The width of the recesses corresponds at least to the inner width of the smaller mouths 4. In an alternative embodiment the recesses 19, 19' might slightly narrow down in flow direction towards the mouths 4 to form a nozzle cross-section similar to a venturi nozzle. In the open position in FIG. 2, the remaining surface portion of the piston extension 14 may be positioned outside the recesses 19' approximately at the level of the valve seat 6, which is here flat and circular.

The guide surfaces L1, L2 effect a forced deflection of the flow; in FIGS. 1 and 2 out of the channel 3 laterally outwards and then upwards into the channels 2. The switch valve in FIGS. 1 and 2 could alternatively operate with reversed flow directions. In an alternative embodiment (not shown) of the blow valve V, the guide surfaces L1 or L2 could also be arranged only on the piston extension 14 or only in the wall 8. Furthermore, the wall 8 could be part of the housing of the blow valve V.

Figure 7:
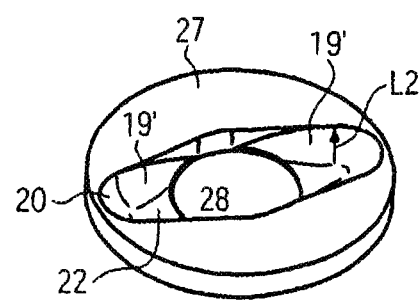
FIG. 7 is a perspective view showing a detail of a further embodiment.

It is outlined in FIG. 1 in broken line at 30 that the ring 9 could be subdivided into a lower ring 29' and an upper ring 27. The upper ring 27 (see FIG. 7) comprises the at least one guide surface L2 and the recesses 19', respectively, with the surface portions 20, 22 outside of a passage 28 for the piston extension 14, and could be a retrofit part.

Figure 3:
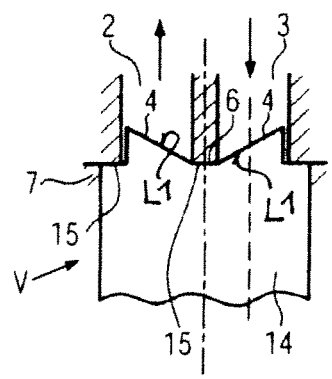
FIG. 3 shows a schematic axial section of another embodiment of the blow valve.

In the embodiment of the blow valve V in FIG. 3, an inflow channel 3 and an outflow channel 2 are provided side by side. The valve seat 6 is flat, just like the closing surfaces 15 on the piston extension 14. Two approximately symmetrical oblique guide surfaces L1 are provided on the piston extension 14; in the open position (not shown), these guide surfaces L1 guide the flow from the channel 3 laterally by forced deflection into the channel 2. The guide surfaces L1 are depicted as inclined ramps, but could also be formed in trough-like recesses and rounded, by analogy with FIG. 2.

Figure 4:
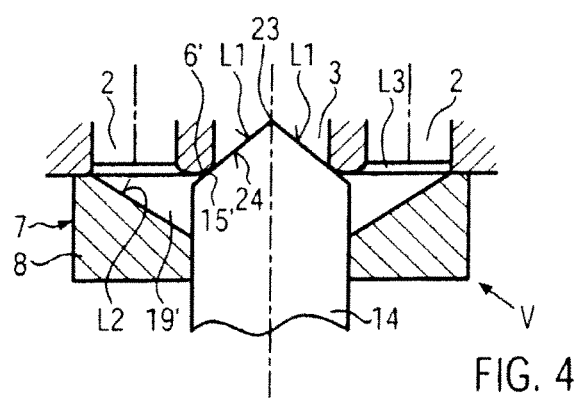
FIG. 4 shows a schematic axial section of a further embodiment of the blow valve.

In the embodiment of the blow valve V in FIG. 4, the piston extension 14 is formed with a conical peak that forms the guide surfaces L1, separated by the flow division zone 23. Alternatively, the guide surfaces L1 could be straight roof surfaces 24, separated by a crest forming the flow division zone 23. The closing surface 15' of the piston extension 14 is here e.g. conical while the valve seat 6' is rounded, resulting here in the sealing effect in the shut-off position with the pair conical surface/rounded circular ring. Either conical or ramp-like guide surfaces L2 are formed with respect to the channels 2 in the wall 8 through which the piston extension 14 passes. The guide surfaces L1, L2 can also be arranged in recesses 19, 19', which are then expediently concavely rounded, by analogy with FIG. 2. In FIG. 4, more than only two exterior channels 2 could be distributed around the central channel 3 in the case of conical guide surfaces L1, L2.

Figure 5:
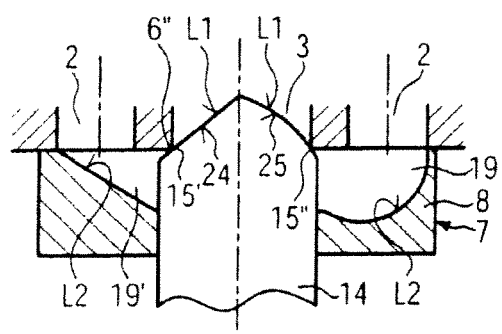
FIG. 5 shows a schematic axial section of two detail variants of the switch valve.

In the embodiment in FIG. 5, the left half depicts the cooperation between a conical closing surface 15' on the piston extension 14 and a valve seat 6" configured as a circularly extending rectangular edge. The guide surfaces L1 on the piston extension 14 and L2 in the wall 8 could e.g. be made conical, by analogy with FIG. 4.

By contrast, the right half of FIG. 5 outlines the cooperation between a spherical closing surface 15" on the piston extension 14 and the edge of the valve seat 6", which is here rectangular. The guide surface L1 on the piston extension 14 is either a surrounding spherical surface or a convexly curved surface. In the wall 8, a concavely rounded surface which is first descending from the inside to the outside and then gradually ascending up and into the channel 2 and which could be formed in a similar recess as the recess 19 in FIG. 2 is shown in the right half as the guide surface L2.

Figure 6:
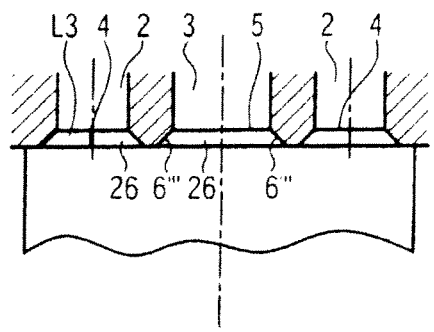
FIG. 6 shows an axial section of part of a blow valve of a further embodiment.

Finally, FIG. 6 illustrates an embodiment in which in at least one of the mouths 4, 5 of the channels 2, 3 a counter-guide surface L3 is provided for further improving the flow guidance. The valve seat 6''' is here e.g. an annular conical surface 26 and can cooperate with a conical or spherically rounded closing surface on the piston extension, which is not shown in FIG. 6, e.g. to carry out a shutting off without any leakage in the shut-off position. The counter-guide surfaces L3 are e.g. conical countersunk portions in the mouths 4, 5.

The invention claimed is:

1. A blow valve of a blow-molding machine for containers, comprising a valve seat which is arranged in a valve chamber between at least one inflow channel mouth and at least one outflow channel mouth and has assigned thereto in the valve chamber a valve piston which is shiftable by a pilot control force linearly between a shut-off position abutting with a closing surface on the valve seat and a lifted open position and which with a piston extension carrying the closing surface passes sealingly shiftably through a bore of a wall defining the valve chamber, wherein a flow path which extends through the valve chamber between the mouths can be shut off in the shut-off position and released in the open position, and for the lateral forced deflection of the flow developing upon lifting of the piston extension in the flow path, the wall and the entirety of the piston extension in contact with the flow include respective trough-like recesses comprising at least one guide surface which is generally inclined relative to the shifting direction of the valve piston.

2. The blow valve according to claim 1, facing the flow is concavely rounded at least in portions, and is respectively concavely rounded in a direction transverse thereto.

3. The blow valve according to claim 1, wherein the valve seat which is oriented perpendicular to the shifting direction of the valve piston and/or the closing surface is made one of flat, spherical or conical.

4. The blow valve according to claim 1, wherein in the open position the guide surfaces on the wall and on the piston extension are harmoniously passed into each other.

5. The blow valve according to claim 1, wherein the guide surface of the wall extends up to the mouth.

6. The blow valve according to claim 1, wherein the wall is formed by a ring inserted into the valve chamber.

7. The blow valve according to claim 1, wherein in the valve chamber in a flat boundary wall next to a central mouth at least one-exterior mouth is provided, which has assigned thereto an outwardly ascending guide surface of the wall, and that the piston extension which is aligned relative to the central mouth and which immerses at least in the shut-off position into the central mouth in portions comprises two descending guide surfaces that are connected via an elevated flow division zone and oriented relative to the respectively exterior mouth.

8. The blow valve according to claim 1, wherein the recesses have at least about the same depth in the shifting direction of the valve piston.

9. The blow valve according to claim 6, wherein the ring is subdivided into an upper ring defining the wall in the valve chamber and comprising the at least one guide surface and into a lower ring.

10. The blow valve according to claim 1, wherein the respective guide surface is arranged between displacement bodies provided in the wall and/or on the valve piston, which in the open position of the blow valve extend up to or near a boundary wall of the valve chamber, which contains the mouths, and minimize the dead volume of the valve chamber.

11. The blow valve according to claim 1, wherein the recesses are gradually narrowing down in flow direction and form a nozzle cross-section similar to a venturi nozzle.

12. The blow valve according to claim 7, wherein the central mouth or one exterior mouth pertains to the inflow channel.

13. The blow valve according to claim 7, and a counter-guide surface is also formed in at least one of the central and exterior mouths.

14. The blow valve according to claim 2, wherein the guide surface facing the flow is concavely rounded in the flow direction.

15. The blow valve according to claim 7, wherein the central mouth is circular.

16. The blow valve according to claim 7, wherein the at least one exterior mouth is circular.

17. The blow valve according to claim 7, wherein the at least one exterior mouth comprises two diametrically arranged exterior mouths.

18. The blow valve according to claim 9, wherein the lower ring seals the valve chamber on the outside relative to an intermediate chamber and/or the control chamber and on the inside on the piston extension.

19. The blow valve according to claim 12, where there are two exterior mouths and each pertain to the inflow channel.

* * * * *